(12) United States Patent
Guittard et al.

(10) Patent No.: US 10,105,938 B2
(45) Date of Patent: Oct. 23, 2018

(54) SELF-STIFFENED COMPOSITE PANEL AND METHOD OF PRODUCING SAME

(71) Applicant: Airbus Operations (S.A.S.), Toulouse (FR)

(72) Inventors: Dominique Guittard, Toulouse (FR); Mathieu Lannuzel, Saint Herblain (FR); Philippe Blot, Nantes (FR); Gilles Bezard, Pornichet (FR)

(73) Assignee: Airbus Operations (S.A.S.), Toulouse (FR)

( * ) Notice: Subject to any disclaimer, the term of this patent is extended or adjusted under 35 U.S.C. 154(b) by 195 days.

(21) Appl. No.: 14/557,074

(22) Filed: Dec. 1, 2014

(65) Prior Publication Data

US 2015/0165744 A1  Jun. 18, 2015

Related U.S. Application Data

(63) Continuation of application No. PCT/FR2013/051159, filed on May 27, 2013.

(30) Foreign Application Priority Data

May 29, 2012 (FR) ..................... 12 54925

(51) Int. Cl.
*B64C 1/06* (2006.01)
*B64C 3/18* (2006.01)
(Continued)

(52) U.S. Cl.
CPC ........ *B32B 37/1284* (2013.01); *B29C 33/306* (2013.01); *B29C 33/3828* (2013.01);
(Continued)

(58) Field of Classification Search
None
See application file for complete search history.

(56) References Cited

U.S. PATENT DOCUMENTS 2,080,771 A   5/1937  Corbyn
2,748,028 A   5/1956  Richardson
(Continued)

FOREIGN PATENT DOCUMENTS

DE   10 2004 025704       12/2005
DE   10 2004 045398 B3    5/2006
(Continued)

OTHER PUBLICATIONS

Machine Translation of DE 19715529 C1, Apr. 14, 1997.*
(Continued)

*Primary Examiner* — Barbara J Musser
(74) *Attorney, Agent, or Firm* — Jenkins, Wilson, Taylor & Hunt, P.A.

(57) ABSTRACT

The disclosure proposes a method for producing a panel having an outer skin and stiffeners that have a connecting portion, and at least one projecting portion, the method comprising a step of draping layers of fibers over at least one insert such that each layer of fibers has a connecting portion and a portion that projects downwardly from the connecting portion, a step of draping a layer of fibers that forms the outer skin, and a step of bonding the layers of fibers together. The disclosure also provides a device for implementing the method.

5 Claims, 3 Drawing Sheets

(51) Int. Cl.
*B29C 70/44* (2006.01)
*B32B 37/12* (2006.01)
*B29D 99/00* (2010.01)
*B29C 70/54* (2006.01)
*B29C 70/86* (2006.01)
*B29C 33/30* (2006.01)
*B29C 33/38* (2006.01)
*B29C 33/48* (2006.01)
*B29K 705/00* (2006.01)
*B29L 31/30* (2006.01)

(52) U.S. Cl.
CPC .......... *B29C 33/485* (2013.01); *B29C 70/443* (2013.01); *B29C 70/543* (2013.01); *B29C 70/86* (2013.01); *B29D 99/0003* (2013.01); *B29D 99/0014* (2013.01); *B64C 1/064* (2013.01); *B64C 3/182* (2013.01); *B29K 2705/00* (2013.01); *B29L 2031/3082* (2013.01); *B32B 2260/00* (2013.01); *Y10T 156/1028* (2015.01)

(56) References Cited

U.S. PATENT DOCUMENTS

| | | | |
|---|---|---|---|
| 3,128,322 A | 4/1964 | Young | |
| 3,205,110 A | 9/1965 | Rinderspacher et al. | |
| 3,264,392 A | 8/1966 | Taplin | |
| 3,349,153 A | 10/1967 | Beck | |
| 3,559,836 A | 2/1971 | Pink et al. | |
| 3,705,606 A | 12/1972 | Stucki | |
| 3,746,051 A | 7/1973 | Mohelnicky et al. | |
| 3,813,739 A | 6/1974 | King | |
| 3,943,980 A | 3/1976 | Rheaume | |
| 4,019,540 A | 4/1977 | Holman et al. | |
| 4,045,986 A | 9/1977 | Laycock et al. | |
| 4,192,638 A | 3/1980 | Lezier et al. | |
| 4,229,497 A | 10/1980 | Piazza | |
| 4,379,101 A | 4/1983 | Smith | |
| 4,388,951 A | 6/1983 | Atkinson et al. | |
| 4,438,790 A | 3/1984 | Steiner | |
| 4,546,803 A | 10/1985 | Dornier | |
| 4,609,519 A | 9/1986 | Pichard et al. | |
| 4,671,470 A | 6/1987 | Jonas | |
| 4,683,018 A | 7/1987 | Sutcliffe et al. | |
| 4,781,569 A | 11/1988 | Kinugasa et al. | |
| 4,943,222 A | 7/1990 | Nathoo | |
| 4,946,526 A | 8/1990 | Petty-Galis | |
| 4,988,469 A | 1/1991 | Reavely et al. | |
| 5,080,142 A | 1/1992 | Calamito et al. | |
| 5,085,814 A | 2/1992 | Kamiyama et al. | |
| 5,224,519 A | 7/1993 | Farley | |
| 5,261,464 A | 11/1993 | Lorenzo et al. | |
| 5,351,722 A | 10/1994 | Mamiliano | |
| 5,429,066 A | 7/1995 | Lewit | |
| 5,429,853 A * | 7/1995 | Darrieux | B29C 70/24 112/440 |
| 5,540,260 A | 7/1996 | Mood | |
| 5,695,848 A | 12/1997 | Wilkins et al. | |
| 5,771,944 A | 6/1998 | Lin | |
| 5,775,381 A | 7/1998 | Addis | |
| 5,820,801 A | 10/1998 | Greve | |
| 5,863,452 A | 1/1999 | Harshberger, Jr. | |
| 5,908,591 A | 6/1999 | Lewit | |
| 5,954,917 A | 9/1999 | Jackson | |
| 6,152,187 A | 11/2000 | Lindblom | |
| 6,164,339 A | 12/2000 | Greenhalgh | |
| 6,257,858 B1 | 7/2001 | Pabsch | |
| 6,315,007 B1 | 11/2001 | Mohamed et al. | |
| 6,478,913 B1 | 11/2002 | Dunleavy et al. | |
| 6,494,235 B1 | 12/2002 | Bruyere et al. | |
| 6,843,953 B2 | 1/2005 | Filsinger et al. | |
| 6,913,045 B2 | 7/2005 | Fantino et al. | |
| 7,413,999 B2 | 8/2008 | Goering | |
| 7,625,618 B1 | 12/2009 | Allen et al. | |
| 7,810,756 B2 | 10/2010 | Alby et al. | |
| 8,001,998 B2 | 8/2011 | Legrand et al. | |
| 8,361,911 B2 | 1/2013 | Legrand et al. | |
| 8,561,649 B1 | 10/2013 | Legrand et al. | |
| 8,770,518 B2 | 7/2014 | Guittard et al. | |
| 9,597,844 B2 | 3/2017 | Blot et al. | |
| 9,862,497 B2 | 1/2018 | Ewens et al. | |
| 9,868,545 B2 | 1/2018 | Brochard et al. | |
| 2002/0153060 A1 | 10/2002 | Amalingan | |
| 2002/0178992 A1 | 12/2002 | Lewit | |
| 2002/0192450 A1 | 12/2002 | Schmidt et al. | |
| 2003/0033008 A1 | 2/2003 | Schmitt et al. | |
| 2003/0090025 A1 | 5/2003 | Nelson et al. | |
| 2004/0000613 A1 | 1/2004 | Thomas | |
| 2004/0000745 A1 | 1/2004 | Channer | |
| 2004/0016084 A1 | 1/2004 | Yarboro | |
| 2004/0222562 A1 | 11/2004 | Kirschner | |
| 2005/0084377 A1 | 4/2005 | Dambrine et al. | |
| 2006/0208135 A1 | 9/2006 | Liguore et al. | |
| 2006/0249217 A1 | 11/2006 | Nayfeh et al. | |
| 2006/0257260 A1 | 11/2006 | Dambrine et al. | |
| 2008/0029644 A1 | 2/2008 | Martinez Cerezo et al. | |
| 2008/0116618 A1 | 5/2008 | Martin | |
| 2008/0156935 A1 | 7/2008 | Alby et al. | |
| 2008/0290214 A1 | 11/2008 | Guzman | |
| 2008/0302912 A1 | 12/2008 | Yip et al. | |
| 2009/0145508 A1 | 6/2009 | Speich et al. | |
| 2009/0223588 A1 | 9/2009 | Dunleavy | |
| 2009/0320292 A1 | 12/2009 | Brennan | |
| 2010/0009124 A1 | 1/2010 | Robins | |
| 2010/0170986 A1 | 7/2010 | Lafly et al. | |
| 2010/0243152 A1 | 9/2010 | Helfrich et al. | |
| 2010/0269948 A1 | 10/2010 | Legrand et al. | |
| 2010/0275764 A1 | 11/2010 | Egres, Jr. | |
| 2010/0319801 A1 | 12/2010 | Legrand et al. | |
| 2011/0014403 A1 | 1/2011 | Wang et al. | |
| 2011/0084428 A1 * | 4/2011 | Wade | B29C 70/342 264/511 |
| 2011/0132523 A1 | 6/2011 | Evens et al. | |
| 2012/0034416 A1 | 2/2012 | Lutz | |
| 2012/0097323 A1 | 4/2012 | Nitsch | |
| 2012/0315455 A1 | 12/2012 | Masaaki | |
| 2013/0115429 A1 * | 5/2013 | Valle | B29C 70/30 428/172 |
| 2013/0328243 A1 | 12/2013 | Hino et al. | |
| 2014/0027957 A1 | 1/2014 | Blot et al. | |
| 2015/0367583 A1 | 12/2015 | Blot et al. | |

FOREIGN PATENT DOCUMENTS

| | | |
|---|---|---|
| DE | 10 2007 026099 | 12/2008 |
| EP | 1216816 A1 | 6/2002 |
| FR | 2440831 | 6/1980 |
| FR | 2673571 | 9/1992 |
| FR | 2929165 A1 | 10/2009 |
| FR | 2942165 | 8/2010 |
| WO | WO-2008/041019 A1 | 4/2008 |
| WO | WO-2008/152248 A2 | 12/2008 |
| WO | WO-2012/007780 | 1/2012 |
| WO | WO-2012/114933 A1 | 8/2012 |

OTHER PUBLICATIONS

Machine Translation of FR 2942165, Aug. 20, 2010.*
Final Office Action for U.S. Appl. No. 13/949,981 dated Nov. 18, 2015.
Non-Final Office Action for U.S. Appl. No. 13/724,475 dated Dec. 21, 2015.
Restriction Requirement for U.S. Appl. No. 14/133,023 dated Feb. 3, 2016.
Advisory Action for U.S. Appl. No. 13/949,981 dated Feb. 11, 2016.
Non-Final Office Action for U.S. Appl. No. 14/133,023 dated Apr. 18, 2016.
Non-Final Office Action for U.S. Appl. No. 13/949,981 dated Jul. 1, 2016.
Final Office for U.S. Appl. No. 13/724,475 dated Jul. 28, 2016.

(56) References Cited

OTHER PUBLICATIONS

Final Office for U.S. Appl. No. 14/133,023 dated Aug. 18, 2016.
Notice of Allowance for U.S. Appl. No. 12/446,320 dated Apr. 13, 2011.
Restriction Requirement for U.S. Appl. No. 12/445,580 dated Feb. 7, 2012.
Non-Final Office Action for U.S. Appl. No. 12/445,580 dated Apr. 17, 2012.
Interview Summary for U.S. Appl. No. 12/445,580 dated Jul. 12, 2012.
French Search Report for Application No. FR 1162499 dated Jul. 17, 2012.
French Patent Application 12 57256 dated Jul. 26, 2012.
Notice of Allowance for U.S. Appl. No. 12/445,580 dated Sep. 21, 2012.
French Search Report for Application No. 12 54 925 dated Mar. 5, 2013.
French Search Report for Application No. FR 1257256 dated Apr. 15, 2013.
Buisson G et al: "Le Preformage, Un Passage Oblige", Revue Generale Des Caoutchoucs Et Plastiques, 461969 1, vol. 71, No. 735, Oct. 1, 1994, pp. 53-56, XP000444728.
French Search Report for Application No. FR 1262466 dated Sep. 4, 2013.
International Search Report for Application No. PCT/FR2013/051159 dated Sep. 11, 2013.
Non-Final Office Action for U.S. Appl. No. 13/724,475 dated Jun. 20, 2013.
Non-Final Office Action for U.S. Appl. No. 13/428,291 dated Jun. 20, 2013.
Notice of Allowance for U.S. Appl. No. 13/720,033 dated Jul. 3, 2013.
Final Office Action for U.S. Appl. No. 13/724,475 dated Dec. 26, 2013.
Notice of Allowance for U.S. Appl. No. 13/428,291 dated Feb. 28, 2014.
Notice of Allowance for U.S. Appl. No. 13/428,291 dated May 30, 2014.
Restriction Requirement for U.S. Appl. No. 13/949,981 dated Feb. 5, 2015.
Non-Final Office Action for U.S. Appl. No. 13/949,981 dated Jun. 12, 2015.
Notice of Allowance for U.S. Appl. No. 14/133,023 dated Nov. 14, 2016.
Final Office Action for U.S. Appl. No. 13/949,981 dated Nov. 18, 2016.
Non-Final Office Action for U.S. Appl. No. 13/724,475 dated Dec. 22, 2016.
Written Opinion for Application No. PCT/FR2013/051159 dated Sep. 11, 2013.
Non-Final Office Action for U.S. Appl. No. 13/949,981 dated Apr. 26, 2017.
Final Office Action for U.S. Appl. No. 13/724,475 dated Aug. 24, 2017.
Interview Summary for U.S. Appl. No. 14/133,023 dated Aug. 31, 2016.

* cited by examiner

SELF-STIFFENED COMPOSITE PANEL AND METHOD OF PRODUCING SAME

CROSS-REFERENCE TO RELATED APPLICATIONS

This application is a continuation of and claims priority to PCT/FR2013/051159 filed May 27, 2013, which claims the benefit of and priority to French Patent Application No. 12 54925 filed May 29, 2012, the entire disclosures of which are incorporated by reference herein.

TECHNICAL FIELD

The disclosure relates to a panel and method for producing a panel comprising elements that increase the rigidity thereof and a device for implementing such a method. The disclosure relates more particularly to a panel and method for producing a panel made of composite material of the type referred to as "self-stiffened", intended for example to be applied to the fuselage, to a structural box section or to a wing of an aircraft.

BACKGROUND

A self-stiffened panel consists mainly of a flat or curved outer skin to which stiffeners perpendicular to the plane of the panel are attached so as to improve the resistance of this sheet with respect to mechanical stresses that are applied thereto.

Each stiffener is an elongate element the vertical cross section of which is L-shaped, T-shaped or U-shaped. The stiffener thus comprises a horizontal portion which is parallel and is fixed to the outer skin, and one or more vertical longitudinal portions which are perpendicular to the main plane of the outer skin.

According to one known embodiment, the outer skin and the stiffeners are made of a composite material; they comprise fibers of at least one material, referred to as reinforcing fibers, which are joined together by a matrix such as a resin.

A conventional method for producing such a self-stiffened panel consists in positioning the outer skin on a molding support, then in fitting the skins intended to form the stiffeners preformed on the outer skin. The assembly is covered by a vacuum bag for forming an air gap around the skins.

Next, wedging means are disposed above the vacuum bag in order to keep the vertical portions of the stiffeners in position. The assembly is placed in an oven in order to polymerize the resin. While they are being fitted, the outer skin and the skins intended to form the stiffeners are preimpregnated with resin. The skins intended to form the stiffeners are fitted by way of preforms, or inserts, which are then withdrawn before the air pocket is put in place, followed by the wedging means.

Before the wedging means are put in place, the vertical portions of the stiffeners are not correctly held by any device. The stiffeners can thus deform, and this deformation will manifest itself in the finished panel. In addition, the putting in place of the vacuum bag and the wedging means can deform the vertical portions of the stiffeners. Finally, such a method requires personnel to act above the support in order to correctly position the various elements, making the work relatively difficult for the production of panels with large dimensions.

One object of the disclosure herein is to provide a method and a device for obtaining a self-stiffened panel for which the vertical portions of the stiffeners are correctly planar, so as to optimize the quality of the panel.

SUMMARY

This disclosure provides a method for producing a self-stiffened composite panel having an outer skin and stiffeners, each stiffener having a portion for connecting the stiffener to the outer skin, and at least one portion that projects from the connecting portion, the method comprising draping layers of fibers that are intended to form the stiffeners over at least one insert having a complementary shape to the final shape of the stiffeners, such that each layer of fibers that is intended to form a stiffener has a connecting portion and a portion that projects downwardly from the connecting portion, draping a layer of fibers that is intended to form the outer skin over the layers of fibers that are intended to form the stiffeners, and simultaneously bonding all the layers of fibers together.

The positioning of each vertical portion of a layer of fibers that forms a stiffener on an insert allows the stiffeners to be kept in shape more easily during the step of bonding together, thereby making it possible to obtain a panel comprising stiffeners with a relatively precise form.

Draping layers of fibers over the at least one insert can be followed by positioning each insert covered by the associated layer of fibers on a molding support.

Positioning the stiffeners can comprise positioning the inserts covered by the layers of fibers in a manner adjacent to one another.

The layers of fibers are intended to be connected together by a matrix, and during the draping and positioning, the layers of fibers are not impregnated with matrix, and bonding together comprises a phase of injecting the matrix and then a phase of hardening the matrix.

Injecting the matrix can comprise injecting the matrix from the bottom upwards.

Bonding together can comprise positioning at least one of a demolding fabric, an air draining felt, a smoothing metal sheet and a vacuum bag on the layer of fibers that is intended to form the outer skin prior to the phase of injecting the matrix.

The panel can comprise metal accessories fixed to the stiffeners and/or to the outer skin, and the method can comprise fitting the accessories at the same time as draping the layers of fibers that are intended to form the stiffeners.

Also disclosed herein is a device for implementing a method according to the disclosure, which comprises a molding support on which the layers of fibers that are intended to form the stiffeners and the outer skin are draped, by way of inserts, and comprising structure for longitudinally and/or transversely positioning each insert on the support.

Positioning of the inserts on the molding support makes it possible to obtain a proper transverse position and parallelism of the vertical portions of the stiffeners. In addition, it is possible to use inserts with different shapes and dimensions on one and the same insert, in order to produce another panel having different dimensions. The positioning structure can comprise a system of keys.

The support can have a horizontal upper face which comprises grooves that engage with the structure for positioning each insert, and orifices for injecting a matrix for connecting the layers of fibers.

Each insert can have a parallelepipedal shape with a longitudinal main orientation and with a rectangular section in a transverse vertical plane.

The support is made from a material having a low coefficient of expansion.

Each insert is made from a material having a high coefficient of expansion.

The device comprises structure for longitudinally and/or transversely positioning each accessory on the support.

BRIEF DESCRIPTION OF THE DRAWINGS

Further features and advantages of the disclosure will become apparent from reading the following detailed description, to understand which reference will be made to the appended drawings, in which.

DETAILED DESCRIPTION

Figure 1:
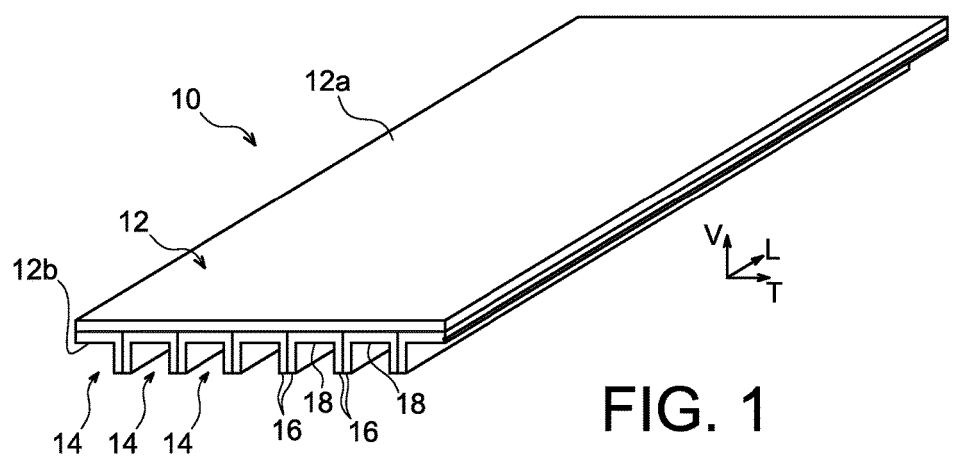
FIG. 1 is a schematic perspective depiction of a self-stiffened composite panel comprising stiffeners, which is able to be produced in accordance with the disclosure.

For the description of the disclosure herein, the orientations longitudinal, vertical and transverse as per the reference frame L, V, T indicated in FIG. 1 will be adopted in a nonlimiting manner.

In addition, a top-down orientation will be adopted as being the orientation in line with the Earth's gravity. It will be understood that the vertical orientation V of the reference frame L, V, T can be coincident with the orientation in line with the Earth's gravity, as shown by way of nonlimiting example. Thus, it will be understood that, in a variant of the disclosure which will be described, the vertical direction V of the reference frame L, V, T may be inclined with respect to the orientation in line with the Earth's gravity.

In the following description, identical, similar or analogous elements will be denoted by the same reference numbers.

FIG. 1 shows a panel 10 of the self-stiffened type which comprises an outer skin 12 and a plurality of stiffeners 14.

The outer skin 12 and the stiffeners 14 are made of a composite material, that is to say they comprise fibers made of at least one material, known as reinforcing fibers, which are connected together by a matrix such as a resin.

The panel 10 has, for example, the purpose of forming a part of the fuselage or of a wing of an aircraft, the outer skin 12 has an external face 12a which is located on the outside of the aircraft, and the stiffeners are located on the inside of the fuselage of the aircraft.

In this case, the panel 10 is shown in the form of a substantially horizontal flat sheet, that is to say a flat sheet that extends in a transverse longitudinal plane. It will be understood that the disclosure is not limited to this form of the panel 10, which may consist of a curved and/or bent sheet.

In addition, to make it easier to understand the disclosure, the panel 10 is shown in a transverse longitudinal main orientation. It will be understood that the panel 10 may have any other orientation without departing from the field of the disclosure.

The stiffeners 14 are intended to be arranged inside the fuselage, and they are thus located on the inner side of the panel 10. Each stiffener 14 is moreover produced such that it has a portion that projects towards the interior from an internal face 12b of the outer skin 12.

Each stiffener 14 comprises an elongate element which extends in a longitudinal main direction. Since it projects vertically from the inner skin, it confers additional stiffness on the bending of the outer skin 12.

As can be seen in FIG. 1, the section of each stiffener 14, in a transverse vertical plane, is L-shaped, T-shaped or U-shaped. Each stiffener 14 comprises a portion 18 for connecting the stiffener 14 to the outer skin, the portion 18 having a transverse longitudinal orientation and abutting the inner face 12b of the outer skin 12. Each stiffener 14 also comprises at least one projecting portion 16 which extends in this case in a vertically longitudinal manner and which projects vertically downward from the connecting portion 18, away from the outer skin 12, from an associated side edge of the connecting portion 18.

The stiffeners 14 are disposed next to one another; they are distributed transversely over the outer skin 12 and transversely abut one another at their projecting portions 16.

Thus, each projecting portion 16 of a stiffener 14 abuts an associated projecting portion 16 of an adjacent stiffener 14. In addition, stiffeners 14 having an L-shaped section are disposed at the lateral ends of the panel 12 and their single projecting portion 16 abuts an associated projecting portion 16 of an adjacent stiffener 14.

Figure 2:
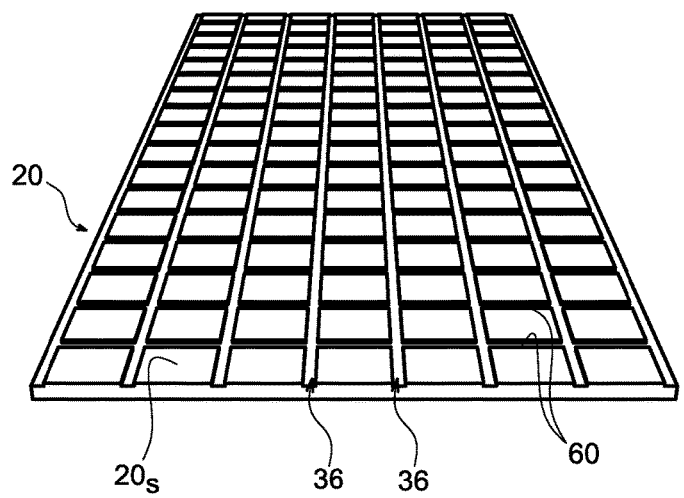
FIG. 2 is a schematic depiction of a support over which the layers of fibers that are intended to form the composite panel shown in FIG. 1 are intended to be draped.

FIG. 2 shows a support 20 on which the panel 10 is intended to be formed.

This support 20, also referred to as "reference plate", comprises a generally parallelepipedal horizontal element, and has a horizontal upper face 20s on which different layers of fibers are successively placed in order to form the panel 10.

Figure 3:
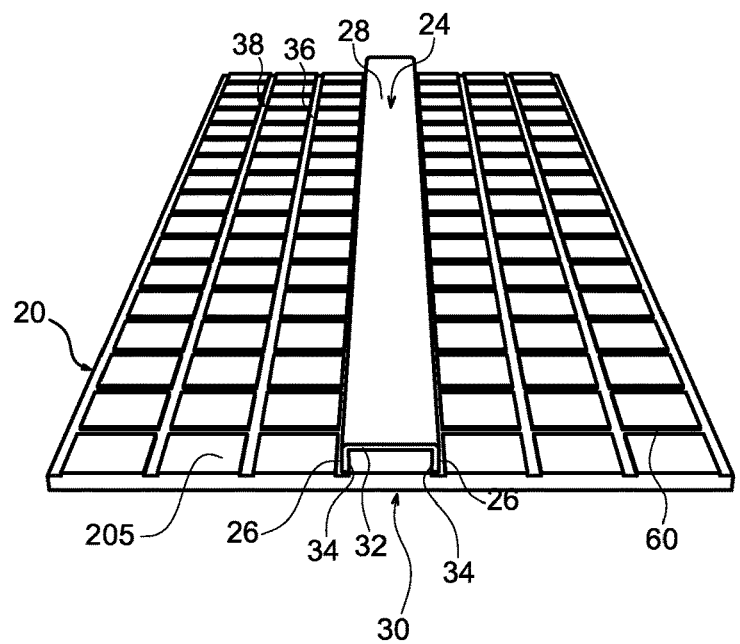
FIG. 3 is a view similar to the one in FIG. 2, in which an insert covered with an associated layer of fibers that is intended to form a stiffener is positioned on the support.

FIG. 3 and the subsequent figures show successive steps in the implementation of the method for producing the panel 10 by way of a device for implementing the method.

The panel 10 is produced in accordance with a method which comprises draping, that is to say successively placing layers of fibers that are intended to form the outer skin 12 and the stiffeners 14 and then bonding them together by curing the matrix.

According to the disclosure, layers of fibers 24 that are intended to form the stiffeners 14 are draped before the layer of fibers 22 that is intended to form the outer skin of the panel 10. In addition, each layer of fibers 24 that is intended to form a stiffener 14 is shaped so as to have the same shape as the stiffener 14 that it is intended to form.

Each layer of fibers 24 that is intended to form a stiffener thus comprises a connecting portion 28 intended to form the connecting portion 18 of the stiffener 14, and at least one vertical longitudinal projecting portion 26 that projects downwards from one edge of the associated connecting portion 28, which is intended to form a projecting portion 16 of the stiffener 14.

In order to maintain the shape of each layer of fibers 24 during the subsequent operations of placing the other layers of fibers 22, 24 that are intended to form the other stiffeners 14 and the outer skin 12, and during the step of bonding the layers of fibers together, the device comprises an insert 30 over which the layer of fibers 24 that is intended to form a stiffener 14 is draped.

This insert 30 has a shape complementary to the final shape of the stiffener 14 to be obtained, that is to say in this case that the section of the insert 30 in a transverse vertical plane is rectangular. The insert 30 thus comprises a horizontal upper wall 32 on which the connecting portion 28 of the layer of fibers 24 is placed, and two vertical longitudinal side walls 34 against each of which a projecting portion 26 of the layer of fibers 24 abuts.

Preferably, the layer of fibers 24 is placed on the insert 30 before it is placed on the support 20. This makes it possible to more effectively drape the layer of fibers 24 since the insert 30 is then easy for an operator to access. In addition, the layer of fibers 24 is held in place on the insert 30 simply by the action of the Earth's gravity, and there is thus no need for any additional holding device.

The assembly formed by the insert 30 and the layer of fibers 24 is placed on the support 20.

The support 20 and the insert 30 comprise structure for horizontally positioning the insert 30 with respect to the support 20, and consequently the layer of fibers 24 with respect to the support 20.

The positioning structure in this case can comprise keys which are received in complementary grooves 36 provided in the support 20, each insert 30 being longitudinally in abutment against the keys.

The method for manufacturing the panel 10 comprises successively draping the layers of fibers 24 that are intended to form the inserts 14 by positioning the assemblies, each of which is formed by an insert 30 and the associated layer of fibers 24, one after the other on the support 20. This successive placing is carried out by positioning the assemblies on the support 20 in a manner adjacent to one another, that is to say by positioning each assembly next to an assembly that has already been put in place.

When two adjacent assemblies are in place on the support 20, their respective inserts 30 are offset transversely with respect to one another and the transverse distance "e" between these two adjacent inserts 30 corresponds to the final width of a stiffener 14.

Two vertical portions 26 each belonging to a layer of fibers 24 are disposed between the two adjacent inserts 30.

According to one embodiment, the transverse distance "e" between two adjacent inserts 30 is defined such that the two vertical portions 26 of the layers of fibers 24 are squeezed transversely between the two inserts 30.

Figure 4:
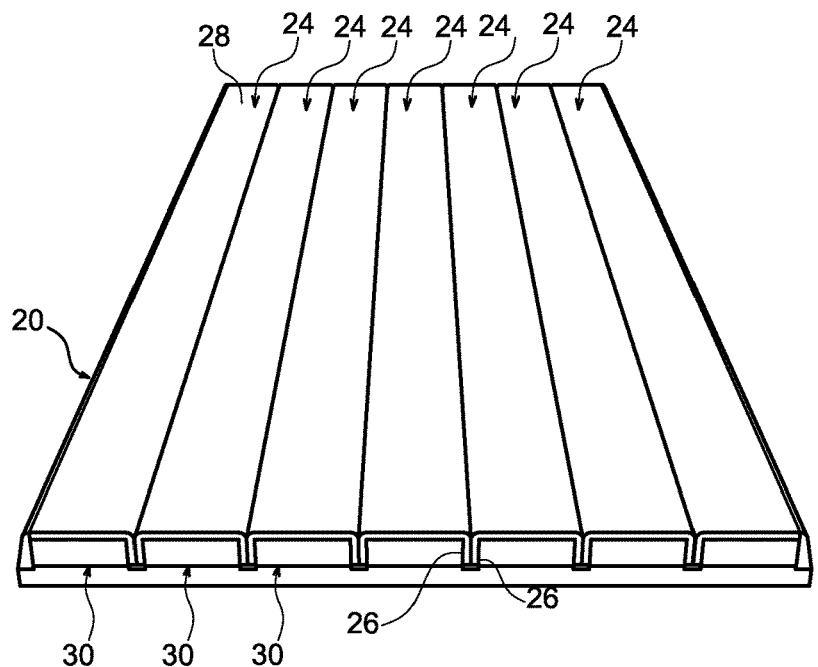
FIG. 4 is a view similar to the one in FIG. 3, in which all of the inserts covered with their associated layers of fibers are in place on the support.

At the end of the placing step, as can be seen in FIG. 4, all of the layers of fibers 24 intended to form the stiffeners 14 are placed on the support 20 and each is held in the final form of the associated stiffener 14 by way of the inserts 30.

According to another aspect of the inserts 30, the latter are produced such that all of the connecting portions 28 of the layers of fibers 24 are located at one and the same vertical distance from the upper face 20s of the support, that is to say that all of the connecting portions 28 of the layers of fibers 24 are located in one and the same horizontal plane.

Next, according to a subsequent step, the layer of fibers 22 that is intended to form the outer skin 12 is draped over the support 20, covering the skins 24 that are intended to form the stiffeners 14, that is to say covering the connecting portions 28 of the layers of fibers 24 that are intended to form the stiffeners 14.

As has been stated above, the connecting portions 28 are all located in a same horizontal plane. They thus define in turn a horizontal plane over which the layer of fibers 22 that is intended to form the outer skin 12 is draped.

At the end of this subsequent step, all of the skins 22, 24 that are intended to form the panel 10 are placed on the support 20. Each vertical portion of a layer of fibers 24 that is intended to form a stiffener 14 extends downwards and is held in this configuration by the Earth's gravity. There is thus no risk of it deforming during the rest of the method.

Figure 5:
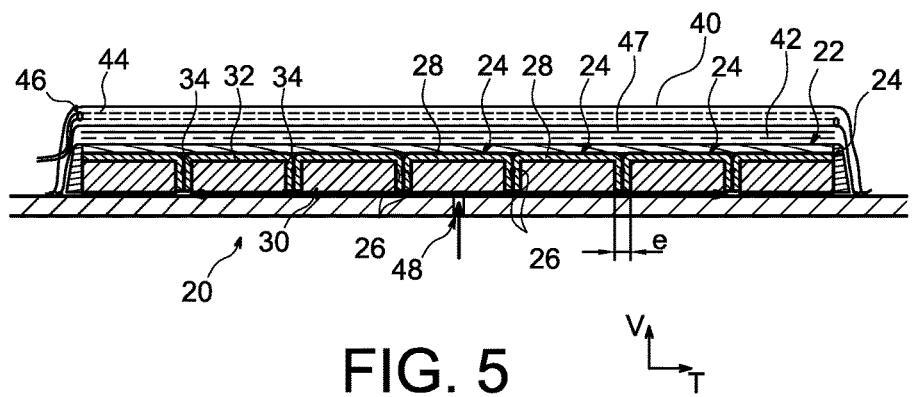
FIG. 5 is a section along a transverse vertical plane of the installation prior to the injection of the matrix.

The same goes for the layer of fibers 22 that is intended to form the outer skin 12 which presses naturally downwards onto the connecting portions 28 of the layers of fibers 24 by way of the Earth's gravity. As is shown in FIG. 5, the skins 22, 24 are then covered with different layers of surrounding materials which will be used during a later step of bonding the layers of fibers 22, 24 together.

These layers of surrounding material consist in particular of a vacuum bag 40 disposed on the outside of the assembly, a fabric 42 facilitating demolding, a fabric or felt 44 for draining the vacuum, and systems 46 for creating the vacuum under the vacuum bag 40, and a smoothing metal plate or "caul plate" 47 for improving the surface state of the outer face 12a of the outer skin 12.

The method comprises a following step of bonding the fibers together in order to obtain the panel.

This step comprises injecting a resin in order to mutually connect the fibers of the different layers 22, 24 and to connect the layers of fibers 22, 24 together.

The resin is injected from the support 20, from the bottom upwards. Thus, the layers of fibers 22, 24 are impregnated from the free lower ends of their projecting portions 26 as far as the layer of fibers 22 that is intended to form the outer skin 12, by flowing between two adjacent inserts 30, into the space defined by their facing side walls 34, between which the vertical portions 26 of the layers of fibers 24 are received.

To this end, the support 20 comprises orifices 48 for injecting resin which emerge at the horizontal upper face 20s of the support 20. Preferably, these orifices emerge in the grooves 36 for the transverse positioning of the inserts 30 on the support 20.

As can be seen in FIG. 3, the position of the grooves 36 on the support 20 is defined such that the keys engaging in the inserts 30 are located at the side walls 34 of the inserts 30. Thus, the longitudinal grooves 36 are located transversely with respect to the vertical projecting portions 26 of the layers of fibers 24.

Once the resin has been injected in its entirety and the air has been removed, the resin is cured, for example in an oven.

According to another aspect of the device, the support 20 is produced from a material that has a low coefficient of thermal expansion, thereby making it possible to limit dimensional variations thereof. By way of example, the constituent material of the support 20 is an alloy of iron and nickel, known as "Invar". In addition, the inserts 30 are produced from a material that has a relatively high coefficient of thermal expansion, such as aluminium, for example.

This makes it easier to detach and demold the inserts 30 from the finished panel 10, in spite of the vertical orientations of the opposing vertical bearing faces between the inserts 30 and the stiffeners 14 obtained in this way. There is thus no need to produce the stiffeners 14 and the inserts 30 with draft angles.

According to a variant embodiment of the self-stiffened panel 10, the latter comprises metal accessories 50 which are integrated into the panel 10 during the production thereof.

These metal accessories 50, such as compression fittings, for example, make it possible in particular to form the supports on which components of the aircraft will subsequently be mounted.

According to this variant embodiment, the accessories 50 are fitted on the inserts 30 or on specific inserts at the same time as the step of placing the layers of fibers 22, 24, and preferably at the same time as the step of placing the layers of fibers 24 that are intended to form the stiffeners 14 on the inserts 30. The inserts 30 are able to carry the accessories 50 in order for them to be positioned with respect to the layers of fibers 22, 24 and with respect to the support 20. According to yet another variant embodiment, each insert 30 comprises recesses (not shown) that are able to partially receive the accessories 50.

Figure 6:
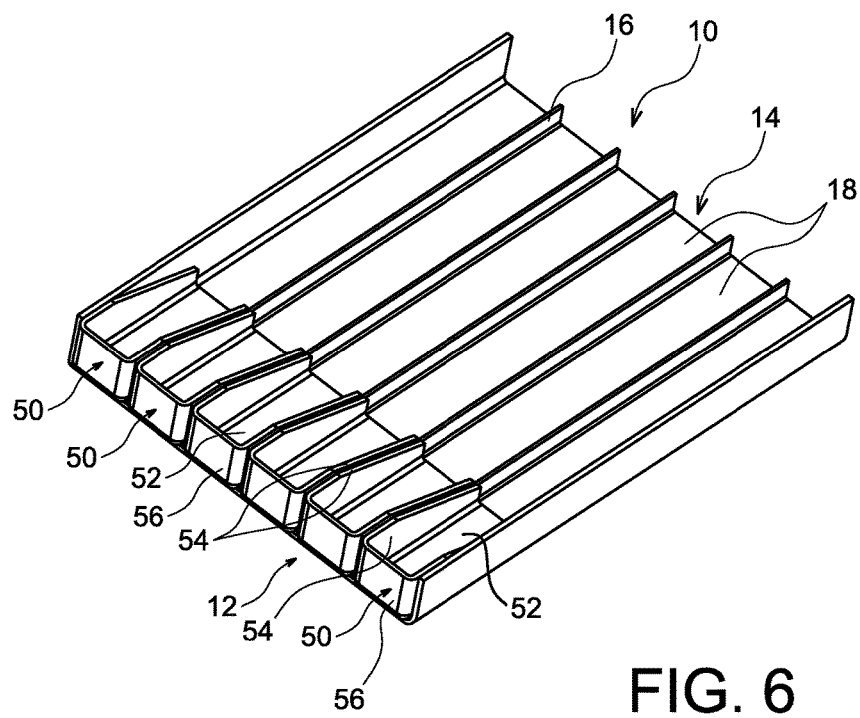
FIG. 6 is a schematic perspective depiction, in bottom view, of a self-stiffened composite panel produced in accordance with the disclosure, comprising stiffeners and metal accessories.

In this case, as shown in FIG. 6, each accessory 50 comprises a compression fitting comprising a transverse longitudinal wall 52 which is located in the same plane as the connecting portion 18 of the associated stiffener 14, two vertical longitudinal side portions 54 each of which is located in a plane of a projecting portion 16 of the stiffener 14, and a transverse vertical portion 56 connected to the longitudinal ends of the other portions 52, 54 of the fitting 50.

The fitting 50 is in this case located at a longitudinal end of the panel 10.

Thus, as it is being fitted, the fitting 50 covers a longitudinal end of the associated insert 30.

It will be understood that the disclosure is not limited to a panel 10 comprising only stiffeners 14 that have vertical longitudinal projecting portions 16 and that the panel may also comprise stiffeners 14 that have transverse vertical projecting portions.

The method for manufacturing a panel comprising such stiffeners 14 is similar to the method which has just been described and the device is suitable for these transverse vertical projecting portions.

To this end, the device comprises a number of longitudinally aligned inserts 30 that are longitudinally offset in order to allow the transverse vertical projecting portions to be formed.

The insert also comprises transverse grooves 60 (shown in FIG. 2) which allow the longitudinal positioning of the inserts 20 on the support 30 and in which injection orifices for the injection of the resin emerge.

While at least one exemplary embodiment of the present disclosure has been shown and described, it should be understood that modifications, substitutions and alternatives may be apparent to one of ordinary skill in the art and can be made without departing from the scope of the disclosure described herein. This application is intended to cover any adaptations or variations of the specific embodiments discussed herein. In addition, in this disclosure, the terms "comprise" or "comprising" do not exclude other elements or steps, and the terms "a" or "one" do not exclude a plural number. Furthermore, characteristics or steps which have been described with reference to one of the above exemplary embodiments may also be used in combination with other characteristics or steps of other exemplary embodiments described above.

The invention claimed is:

1. A method for producing a self-stiffened composite panel having an outer skin and stiffeners, each stiffener having a portion for connecting the stiffener to the outer skin, and at least one portion that projects from the connecting portion, the method comprising:
   draping layers of fibers, that are intended to form the stiffeners, over at least one insert having a complementary shape to a final shape of the stiffeners, such that each layer of fibers that is intended to form a stiffener has a connecting portion and a free lower end portion that projects vertically downwardly from the connecting portion;
   draping a layer of fibers that is intended to form the outer skin over the connecting portion of the layers of fibers that are intended to form the stiffeners; and
   simultaneously bonding all the layers of fibers together by a matrix using the at least one insert as a mold element;
   wherein, during draping, the layers of fibers are not impregnated with matrix and bonding together comprises a phase of injecting the matrix and then a phase of hardening the matrix, and wherein injecting the matrix comprises injecting the matrix from a bottom upwards from the free lower end portion.

2. The method according to claim 1, wherein draping layers of fibers over the at least one insert is followed by positioning each insert covered by the layer of fibers on a molding support.

3. The method according to claim 2, comprising a positioning step comprising positioning the inserts covered by the layers of fibers in a manner adjacent to one another.

4. The method according to claim 1, wherein the bonding together comprises positioning at least one of a demolding fabric, an air draining felt, a smoothing metal sheet and a vacuum bag on the layer of fibers that is intended to form the outer skin prior to the phase of injecting the matrix.

5. The method according to claim 1, wherein the panel comprises metal accessories fixed to the stiffeners and/or to the outer skin, and wherein the method comprises fitting the accessories at a same time as draping the layers of fibers that are intended to form the stiffeners.

\* \* \* \* \*